United States Patent [19]

Rigollot

[11] 3,757,517
[45] Sept. 11, 1973

[54] POWER-GENERATING PLANT USING A COMBINED GAS- AND STEAM-TURBINE CYCLE

[76] Inventor: Georges Alfred Rigollot, 66 Avenue Henri Martin, Paris, France

[22] Filed: Feb. 15, 1972

[21] Appl. No.: 226,553

[30] Foreign Application Priority Data
Feb. 16, 1971   France ................................. 7105195

[52] U.S. Cl. .......... 60/39.18 R, 60/39.18 B, 290/52
[51] Int. Cl. ............................................. F02c 1/04
[58] Field of Search ................ 60/39.18 R, 39.18 A, 60/39.18 B, 39.18 C; 290/2, 52

[56] References Cited
UNITED STATES PATENTS

| | | | |
|---|---|---|---|
| 3,631,673 | 1/1972 | Charrier.......................... | 60/39.18 C |
| 3,151,250 | 9/1964 | Carlson................................. | 290/52 |
| 1,846,389 | 2/1932 | Gay................................. | 60/39.18 B |
| 3,289,402 | 12/1966 | Jung et al........................ | 60/39.18 R |

*Primary Examiner*—Carlton R. Croyle
*Assistant Examiner*—Warren Olsen
*Attorney*—Ernest A. Greenside et al.

[57]   ABSTRACT

Power-generating plant using a combined gas- and steam-turbine cycle. The plant comprises a reservoir in which cold air under pressure is stored during off-peak hours for being used during peak-hours to supply, in parallel with compressors, the gas turbine of the plant. A liquefaction and distillation unit is used on the supplying air circuit with a view to supply the steam boiler with air enriched with oxygen and the gas turbine with a mixture of air and nitrogen.

7 Claims, 2 Drawing Figures

POWER-GENERATING PLANT USING A COMBINED GAS- AND STEAM-TURBINE CYCLE

The present invention has essentially for its object a power-generating plant using a combined gas- and steam-turbine cycle. The power plant according to the invention is of the type comprising off-peak-time energy storage and is provided to this end with a reservoir in which cold air under pressure is stored during off-peak hours, the said stored air being used during peak-hour power generation to supply, in parallel with compressors, the gas turbines of the plant.

A plant of a nearly similar type is disclosed in U.S. Pat. No. 3,528,582 filed in the name of the same Applicant.

Combined power-generation cycles using gas turbines and steam turbines are well-known. The invention is directed at improving systems using such cycles by the use of a refigerating unit and the storage of compressed air at low temperature.

A plant according to the invention is characterized in that combined use is made of :
a. a boiler supplying steam turbines diring an alternator,
b. air compressors supplying :
  i. during power-consumption periods, gas turbines suitably supplied with fuel gas and driving an alternator,
  ii. during off-peak hours, a reservoir for the storage of air under pressure supplied at low temperature through the medium of a refrigerating unit,
c. and an air liquefaction and distillation unit supplying the boiler with air enriched with oxygen and the gas-turbine combustion chambers with nitrogen, the negative calories necessary for the liquefaction of the air being at least partially obtained in exchangers from the negative calories freed by heating, before use, of the mixture enriched with oxygen and of the nitrogen supplied to the boiler and the gas turbines respectively.

By thus achieving a distillation of the plant air supply, nitrogen in the air can be used as a dilution fluid in the combustion chambers of the reheat gas-turbines (which also receive a stoichiometric amount of air necessary for the burning of the fuel used), while the mixture of air enriched with oxygen is used as a rich combustion-supporting fluid for the fuel in the steam boiler.

It is readily understood that two very important advantages are thus obtained :
1. The gases which expand in the gas turbines are neutral gases. The absence of oxygen, which is an oxidizer and catalyser, reduces the aggressiveness of the fuel and enables the intake temperatures to be increased without danger, the result being an important power gain for a given size of gas turbines;
2. The use of a combustion-supporting fluid enriched with oxygen enables the heating capacity of the boiler to be increased by preventing sweep of the boiler by a large amount of nitrogen, the sensible heat of which would be largely lost in the smoke.

A large number of complementary advantages stem from use of the combined gas-turbine and steam-turbine cycle including liquefaction of air and a separation of nitrogen and oxygen, gas circuit independence from the gas turbines and the boiler. Specifically, the following considerable advantages are obtained :

costly connecting flues between the turbine exhaust and the boiler burner cases are eliminated ;
gas flow in the boiler and sensible-heat losses in the smoke are reduced ;
transition from conventional steam-cycle operation to combined-cycle operation and vice versa is considerably simplified, since there is no longer any need to take into the account the important thermal inertia of the exchangers usually present in the cycle ;
life of the gas turbines is increased owing to reduced corrosive attacks and higher efficiencies are obtained since the turbines may operate at higher temperatures.

Furthermore, the use of a unit for the storage of compressed air at low temperature enables the separation of nitrogen and air enriched with oxygen to be performed economically, by making use, to this end, of equipment has economic and profitable advantages. Otherwise stated, the compressed-air refrigeration unit used for the storage of cold air under pressure in a container is also employed for the liquefaction and distillation of the boiler and turbine supply air. The adaptation of a distillation unit to such installation is a simple and economic procedure.

The invention and objects, characteristics and advantages thereof will to be apparent from the following disclosure with reference to the appended drawings illustrating by way of example one form of an embodiment of the invention and wherein.

Figure 1:
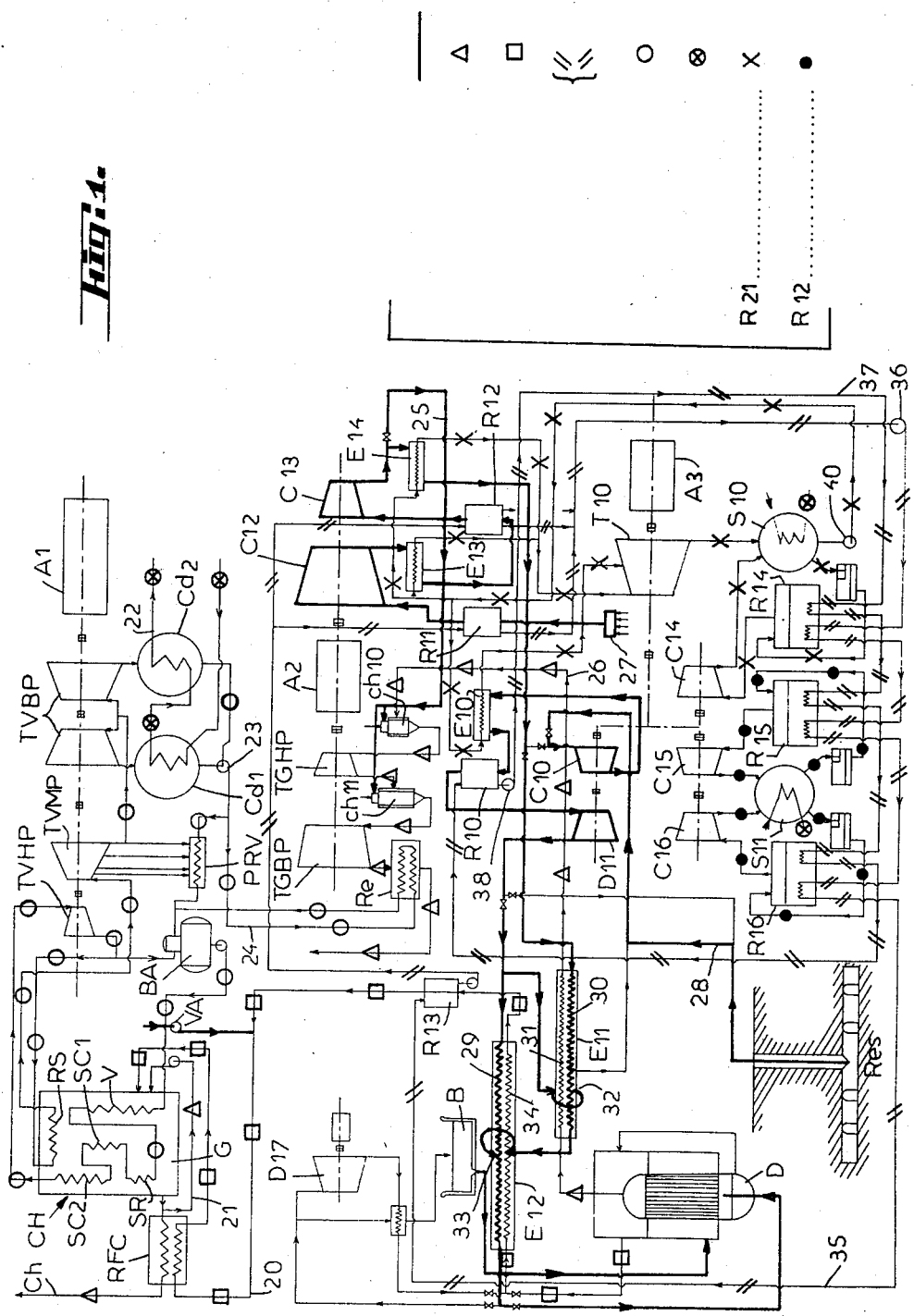
FIG. 1 is a diagrammatic view of a plant with the circulation circuits used when the plant operates to produce maximum power.

Legends are used in both drawings to distinguish between the various fluids circulating under maximum or other such conditions in the various circuits and apparatus. Flow directions are indicated by arrows.

According to the form of embodiment illustrated, the plant comprises essentially :

1. A boiler CH which, in the example considered, is a forced circulation boiler, but which may be any other type , for instance provided with a drum, the said boiler comprising a combustion chamber G a vapourization unit V, a radiation superheater RS, two convection superheaters SC1, SC2 and one reheat superheater RS. It may also be of the pressure combustion type.

The boiler is supplied with hot water under pressure from a supply tank BA. It is supplied with combustion-supporting fluid by an air fan VA as well as by a flow of air enriched with oxygen arriving through the circuit 20 and heated before entering the boiler by a combustion-supporting fluid heater RFC in counter-flow to the circuit of smoke escaping through the stack Ch. The boiler also comprises a smoke recycling circuit 21.

The size of the boiler is so selected as to to ensure obtention of about 60 percent of its nominal vapourization capacity when it is supplied with air by the fan VA, and to ensure achieving such capacity when it is supplied with 20 percent by the fan VA and 80 percent with combustion-supporting fluid enriched with oxygen supplied through the circuit 20.

2. High-pressure steam turbines TVHP, medium pressure steam turbines TVMP and low-pressure steam turbines TVBP.

All of these turbines are coupled to the shaft of an alternator A1 which is driven thereby.

The high-pressure turbine TVHP is supplied with steam proceeding from the superheater SC2. Subsequent to expansion in this turbine, the steam is re-superheated in the reheat superheater RS before being injected into the inlet of the medium-pressure turbine TVMP.

The medium-pressure turbine exhaust circuit supplies two low-pressure turbines TVBP in parallel, the exhaust circuits of which are connected with condensers Cd1 and Cd2 cooled by a raw-water refrigeration circuit 22. The water condensed in the condensers is thereafter retaken by a pump 23 and conveyed back to the supply tank BA. The greater part of the condensed water is conveyed into the circuit 24 in order to be heated in a recuperating exchanger Re which is supplied with calories by the sensible exhaust heat of the low-pressure gas turbines TGBP (combined cycle), whereas another part of the condensed water passes through a steam heating station PRV before being conveyed into the supply tank BA. The latter is also partially supplied with superheated steam proceeding from the high-pressure turbine exhaust circuit TVHP.

3. Two gas-turbine stages, one of which is a high-pressure stage TGHP and the other a low-pressure stage TGBP. During maximum-power generation periods, these turbines are supplied partly with stoichiometric combustion-air conveyed by circuit 25 and partly with dilute nitrogen conveyed by circuit 26 to the combustion chambers ch10 and ch11, respectively, of the two turbines.

The sensible exhaust-heat of the low-pressure turbine is recuperated to a large extent by the recuperating exchanger Re (combined cycle).

4. A compressed-air storage reservoir Res supplied during off-peak hours with cold air under pressure admitted at 27 into the plant, compressed in successive compressors C12, C13 and C10, with a recuperation of the compression calories in the exchangers E13, E14 and E10 is then refrigerated in the refrigerating device R10 followed by partial expansion in the expansion turbine D11.

During a full-power generation period, air under pressure is supplied from the reservoir Res through line 28, compressor C10, exchanger E10, refrigerating device R10 and expansion turbine D11 to exchangers E11 and 12. External air is supplied at 27 is passed successively through refrigerating device R11, compressor C12, exchanger E13, refrigerating device R12, compressor C13 and exchanger E14 wherefrom it also enters exchanger E11.

The gas turbines TGBP, TGHP and the compressors C12 and C13 are mounted on a common shaft which is also that of the alternator A2.

5. A compressor with several bodies C12, C13, already largely described hereinabove under (4) and operating essentially in two different manners.

During off-peak hours, by direct sucking of external air at 27 and compression of the latter up to the pressure of admission into the reservoir through the medium of an interposed compressor-expansion turbine set C10, D11 enabling the admitted air to be cooled to a mean temperature of $-50°$ C;

during load hours, by sucking air which is first cooled in the refrigerating devices R11 and R12 before being admitted into the compressors, so as to enable the output of the compressors to be increased without substantially modifying their power.

6. An air distillation unit comprising a distilling column D and two exchangers E11, E12 in counterflow.

The distillation unit operates only during peak hours.

The cold compressed air proceeding from the reservoir Res is supplied at 29 into the exchanger E12 and at 32 into the exchanger E11.

The less-cooled compressed air proceeding from the compressors C12, C13 is supplied into the exchanger E11 at 30, i.e., upstream of 32 with respect to air circulation in the exchanger, and, after passing through exchanger E11, is supplied into exchanger E12 at 33, i.e., downstream of 29 with respect to the air circulation in this exchanger.

On the other hand, the exchangers E11 and E12 are traversed in counterflow by, respectively, the distillated nitrogen leaving column D at 31 and the liquid air enriched with oxygen, at 34.

Thus, the negative calories necessary to approximate to liquefaction are largely recuperated as a result of the heating, prior to supplying the plant, of the nitrogen and the air enriched with oxygen, respectively.

The high-potential negative calories at the exit of the air enriched with oxygen (circuit 34) are recuperated in the refrigerating device R13 through which a suitable fluid is made to flow.

7. Two glycol washing-exchange units allowing for the transfer of the residual medium-potential negative-calories and their use before and during air compression.

These units comprise respectively:

a circuit 35 including refrigerating devices R13, R11, R12, a circulation pump 36 and refrigerating devices R14, R15 and R16;

a circuit 37 with a refrigerating device R10, a pump 38 and refrigerating devices R14, R15 and R16.

8. A unit for recuperating the calories produced by the compression of air and for simultaneously producing the medium-potential low-temperatures necessary to balance the thermal cycle.

This unit comprises:

a special fluid circuit such as the one known under the trademark "R21" marketed by the firm Dupont de Nemours, the said circuit comprising a condenser S10, a circulation pump 40, exchangers E13, E14 and E10 in parallel; the fluid, after being heated and vapourized, is expanded in a power-recuperation turbine T10 mounted on the shaft of an alternator A3 (on which are also mounted, with suitable interposed differential gears, the compressors C10, C14, C15, C16 and the expansion turbine D11).

The fluid circuit "R21" also comprises the compressor C14 which produces a vapourization and an expansion in the refrigerating device R14 so as to reduce the temperature.

A second special fluid circuit such as the one known under the trademark "R12" marketed by the firm Dupont de Nemours, this second circuit comprising a condenser S11 and vapourizing-refrigerat-ing devices R15, R16 which are cooled by the vapourization of the fluid "R12" produced during the operation of the compressors C15, C16.

9. A small unit for the generation of make-up liquid air necessary for mass balance, the said unit operating in intermediate periods, when important power-supplies are not required.

This unit comprises the exchanger E12 (FIG. 2), the circuit 29 of which is supplied with cold air under pressure proceeding from the expansion turbine D11. At the outlet of the exchanger, the air is expanded at a low temperature in the expansion turbine D17 mounted on the shaft of an alternator A4. The low-temperature air leaving the turbine D17 passes through an exchanger E15 and then through the portion 34 of the exchanger E12 in counterflow to the entering air.

The air to be liquefied is taken in parallel at the inlet of the expansion turbine D17 and is liquefied under pressure in the exchanger E15 and then expanded and stored in the reservoir B.

The operation of the plant will now be briefly described.

DAYTIME OPERATION, FULL-LOAD HOURS

During twelve hours a day, corresponding to full-power operation of the plant, the boiler is supplied with air enriched with oxygen. The steam set operates at full capacity.

The compressor operates with a maximum mass rate-of-flow resulting in particular from the pre- refrigeration of the air in the refrigerating devices R11 and R12. The compressed air is used partly as stoichiometric combustion air in the combustion chambers $ch10$ and $ch11$ of the gas turbines, and partly to supply the distillation unit separating the air into nitrogen and air enriched with oxygen. The compressed-air reservoir also supplies the distillation unit.

The calories used by the air compression are largely recuperated in the exchangers E13, E14 and E10 for the operation of the power-recuperating turbine T10 driving the alternator A3.

The two glycol units economically ensure the transfer and use of the negative calories in the cycle.

The water condensed in the boiler supply condensers is heated partly in the heat recuperator Re by the exhaust gases of the gas turbine (combined cycle) and partly by the withdrawal station PRV of the steam set.

The combustion-supporting fluid (enriched air) is heated by the recuperator RFC in counterflow to the smoke leaving the boiler.

The flows of the various fluids in the plant are indicated in FIG. 1.

The main operating conditions which may be used in a plant of this type are summarized in the following tables for the various circuits : air, nitrogen, oxygen, boiler water, exchange fluid, special fluids "R21" and "R12."

Daytime operation

| | | Air circuit | | | |
|---|---|---|---|---|---|
| | Apparatus | temperature (°C) | | pressure (bars) | |
| | | inlet | outlet | inlet | outlet |
| proceeding from reservoir | Res | | -50 | | 80-45 |
| | $C_{10}$ | | | | 81 |
| | $E_{10}$ | | | 81 | |
| | $R_{10}$ | | -20 | | |
| | $D_{11}$ | -20 | -70 | | 42 |
| | $E_{11}$ | -70 | -120 | | 42 |
| proceeding from compressors | $R_{11}$ | 15 | -40 | 1 | 1 |
| | $C_{12}$ | -40 | 154 | 1 | 6.6 |
| | $E_{13}$ | 154 | 35 | 6.6 | 6.6 |
| | $R_{12}$ | 35 | -40 | 6.6 | 6.6 |
| | $C_{13}$ | -40 | 154 | 6.6 | 42 |
| | $E_{14}$ | 154 | 45 | 42 | 42 |
| | $E_{11}$ | 45 | -120 | 42 | 42 |
| proceeding from reservoirs + compressors | $E_{12}$ | -120 | -140 | | 42 |
| | D | -140 | | 42 | |
| water supply tank | | | -180 | | 1 |

| Apparatus | temperature (°C) | | pressure (bars) | |
|---|---|---|---|---|
| | inlet | outlet | inlet | outlet |
| Nitrogen circuit | | | | |
| D | | -140 | | 41 |
| $E_{11}$ | -140 | -8 | 41 | 41 |
| $ch_{10}$ | -8 | 850 | 41 | 40 |
| TGHP | 850 | 577 | 40 | 10 |
| $ch_{11}$ | 577 | 1000 | 10 | 10 |
| TGBP | 1000 | 530 | 10 | 1 |
| Rec | 530 | 100 | 1 | 1 |
| Oxygen circuit | | | | |
| D | | -180 | | 1 |
| $E_{12}$ | -180 | -90 | 1 | 1 |
| $R_{13}$ | -90 | -25 | 1 | 1 |
| RFC | -25 | 300 | 1 | 1 |
| Boiler water | | | | |
| $Cd_1$ | | 32.5 | | 0.05 |
| $Cd_2$ | | 32.5 | | 0.05 |
| Rec | 32.5 | 240 | 40 | 40 |
| PRV | 32.5 | 150-230 | 40 | 40 |
| BA | ∼240 | ∼240 | 40 | 40 |
| CH | 240 | 540 | 170 | 165 |
| TVHP | 540 | 325 | 165 | 36 |
| R S | 325 | 545 | 36 | 36 |
| TVMP | 545 | 300 | 36 | 6 |
| TVBP | 300 | 55 | 6 | 0.05 |

| Temperatures (°C) |
|---|

Exchange fluid (\\)

| apparatus | $R_{14}$ | $R_{15}$ | $R_{16}$ | $R_{13}$ | $R_{11}$ | $R_{12}$ |
|---|---|---|---|---|---|---|
| inlet |  | 15 | -10 | -20 | -50 | -50 |
| outlet | 15 | -10 | -20 | -50 | 5-15 | 25-30 |

Exchange fluid (//)

| apparatus | $R_{14}$ | $R_{15}$ | $R_{16}$ | $R_{10}$ |
|---|---|---|---|---|
| inlet |  | 15 | -10 | -20 |
| outlet | 15 | -10 | -20 | 20-30 |

"R21"

| apparatus | $S_{10}$ | $E_{13}$ | $E_{14}$ | $E_{10}$ | $T_{10}$ | $R_{14}$ | $C_{14}$ |
|---|---|---|---|---|---|---|---|
| inlet |  | 29 | 29 | 29 | {104 / 80-90} | 29 | 10 |
| outlet | 29 | 104 | 104 | 80-90 | 30-40 | 10 | 30-40 |

"R12"

| apparatus | $S_{11}$ | $R_{15}$ | $C_{15}$ | $R_{16}$ | $C_{16}$ |
|---|---|---|---|---|---|
| inlet |  | 29 | -15 | 29 | -25 |
| outlet | 29 | -15 | 30-40 | -25 | 20-30 |

OFF-PEAK-TIME OPERATION

Assuming the plant is operated at full power during, for instance, 12 hours in daytime, it may be used by night during, for instance, 8 hours to supply power to the network and, furthermore, to ensure the filling of the reservoir with compressed air at low temperature.

Figure 2:
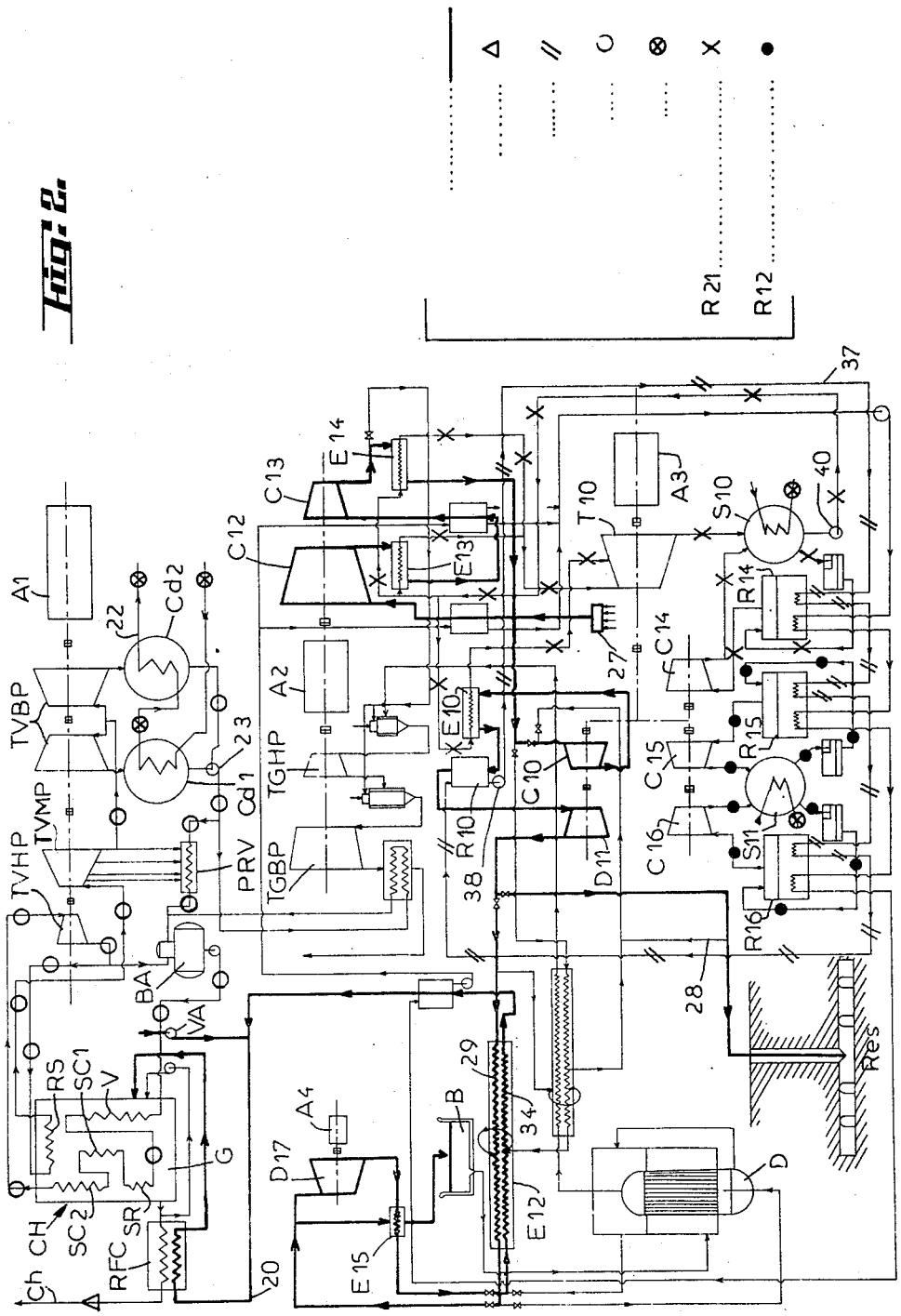
FIG. 2 is a diagrammatic view illustrating the operation of the plant during off-peak hours or during an intermediate period and illustrates the circuits concerned.

During this period of operation, and as can be seen in FIG. 2, the boiler is supplied with combustion-supporting fluid by the air fan VA only. The steam set operates at about 50 to 60 percent load. The gas turbines are not supplied and the condensed water is entirely heated by the withdrawals from the turbine TVMP at the heating station PRV. The combustion air is heated by the smoke in the recuperator RFC.

The alternator A2 drives the compressors which fill the reservoir Res with compressed air at low temperature. The power consumption of the alternator A2 forms part of the power supplied by the alternator A1.

INTERMEDIATE OPERATION

Again during off-peak periods, for instance during 4 hours by night, in addition to the plant off-peak operation described above, the liquefied-air generating unit is operated by supplying the exchanger E12, the expansion turbine D17 and the exchanger E15 with cold compressed air proceeding from the expansion turbine D11, as shown in FIG. 2. During this operating period, the boiler is supplied with combustion-supporting matter by the air leaving the exchanger E12 and flowing through the circuit 20.

In case the compressors are stopped, the air conveyed to the liquefaction unit is supplied from the reservoir Res.

The main operating conditions of the various apparatus during this operating period of the plant are summarized in the following tables.

Night and intermediate operation

| Apparatus | Air circuit | | | |
|---|---|---|---|---|
| | Temperature (°C) | | Pressure (bars) | |
| | inlet | outlet | inlet | outlet |
| $C_{12}$ | 15 | 255 | 1 | 6.6 |
| $E_{13}$ | 255 | 50 | 6.6 | 6.6 |
| $C_{13}$ | 50 | 275 | 6.6 | 42 |
| $E_{14}$ | 275 | 50 | 42 | 42 |
| $C_{10}$ | 50 | ~180 | 42 | 80–45 |
| $E_{10}$ | ~180 | 90 | | |
| $R_{10}$ | 90 | –20 | | |
| $D_{11}$ | –20 | –50 | 80–45 | 70–45 |
| Res | –50 | | 70–45 | |
| (intermediate) | | | | |
| $E_{12}$ | –50 | –140 | | 40 |
| $D_{17}$ | –140 | –190 | 40 | 1 |
| $E_{15}$ | –190 | –140 | 1 | 1 |
| $E_{12}$ | –140 | –50 | 1 | 1 |
| RFC | –50 | 300 | 1 | 1 |
| $E_{15}$ | –140 | –184 | 40 | 1 |

| Temperatures (°C) | | | | | | |
|---|---|---|---|---|---|---|
| Exchange fluid (//) | | | | | | |
| apparatus | $R_{14}$ | $R_{15}$ | $R_{16}$ | $R_{10}$ | | |
| inlet | | 15 | -10 | -20 | | |
| outlet | 15 | -10 | -20 | 20-30 | | |
| "R21" | | | | | | |
| apparatus | $S_{10}$ | $E_{13}$ | $E_{14}$ | $E_{10}$ | $T_{10}$ | $R_{14}$ $C_{14}$ |
| inlet | | 24 | 24 | 24 | {140 / ~120} | 24  10 |
| outlet | 24 | 140 | 140 | 100-130 | 40-50 | 10  40-50 |
| "R12" | | | | | | |
| apparatus | $S_{11}$ | $R_{15}$ | $C_{15}$ | $R_{16}$ | $C_{16}$ | |
| inlet | | 24 | -10 | 24 | -20 | |
| outlet | 24 | -10 | 30-40 | -20 | 20-30 | |

Of course, a great number of intermediate processes and operations between those just described may be used according to the operating conditions of the plant.

By way of example, the main operating characteristics of a plant of the type described may be as follows :

Boiler fuel flow : 133 t/h

Oxygen content of the combustion-supporting mixture : 47 %

Steam-turbine power : 750 Mw

Fuel flow in the gas-turbine combustion chambers : 48 t/h

Gas-turbine power : 400 Mw

Compressor power : 160 Mw

Power delivered at night : 220 Mw
Power delivered during full-load periods : 1,000 Mw Of course, the invention is by no means limited to the form of embodiment described and illustrated, which has been given by way of example only. In particular, it comprises all the means constituting technical equivalents to the means described as well as their combinations, should the latter be carried out according to the spirit of the invention .

What is claimed is:

1. Power-generating plant adapted for power storage during off-peak hours and comprising an alternator, steam turbines operatively connected to said alternator for driving the same, a boiler connected to said steam turbines for supplying steam thereto, a second alternator, gas turbine means supplied with fuel gas and connected to said second alternator for driving the same, air compressor means connected to said gas turbine means for supplying during power consumption periods compressed air thereto, a reservoir operatively connected to said compressor means for storing air under pressure during off-peak hours, a refrigeration unit connected to said compressor means and through the intermediary of which said air under pressure is supplied at low pressure to said reservoir, an air liquefaction and distillation unit operatively connected to said boiler and to said gas turbine means for supplying air enriched with oxygen to the boiler and a mixture of air and nitrogen to said gas turbine means, and recuperating exchangers operatively connected to said air liquefaction and distillation unit and respectively to said boiler and to said gas turbine means for transferring to said liquefaction unit the negative calories freed by the heating of the cold oxygen and nitrogen supplied to said boiler and to said gas turbine.

2. Plant according to claim 1, including a recuperating exchanger operatively connected to said gas turbine and said boiler for transferring the heat values of the turbine exhaust gases to a water-supply circuit for the boiler.

3. Plant according to claim 1, comprising at least one heat exchange circuit for transferring heat energy resulting from air compression in said compressors to a working-fluid-supply cicuit expanding in an expansion turbine for driving a third alternator electrically connected to the other alternators.

4. Plant according to claim 1, wherein said air liquefaction and distillation unit comprises two exchangers which, during power-generation periods, are traversed respectively by distillated nitrogen and air enriched with oxygen, said exchangers being traversed in counterflow by air from the compressors but cooled beforehand, part of the air flow passing directly through the enriched-air exchanger and another part passing successively through the nitrogen exchanger and said enriched-air exchanger.

5. Plant according to claim 1, wherein said liquefaction and distillation unit is supplied with compressed air from said reservoir and from said compressors.

6. Plant according to claim 5, comprising in advance of said liquefaction and distillation unit, at least one refrigeration unit for the refrigeration of the compressed air for lowering the air temperature to about minus 50° C.

7. Plant according to claim 1, wherein said air liquefaction unit comprises an exchanger having two counterflow circuits, one of which is supplied with cold air under pressure derived from an expansion turbine, said cold air thereafter dividing into two flows the first main one passing through another expansion turbine and then into another exchanger and then into the second counterflow circuit of said exchanger and the second one air flow passing through said other exchanger and then supplying in liquefied state a second reservoir, said main air flow leaving the first named exchanger serving to supply said boiler.

* * * * *